US009846916B2

(12) United States Patent
Juan et al.

(10) Patent No.: US 9,846,916 B2
(45) Date of Patent: Dec. 19, 2017

(54) CLUSTERING A USER'S CONNECTIONS IN A SOCIAL NETWORKING SYSTEM

(75) Inventors: Yun-Fang Juan, Cupertino, CA (US); Ming Hua, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1012 days.

(21) Appl. No.: 13/179,547

(22) Filed: Jul. 10, 2011

(65) Prior Publication Data

US 2013/0013682 A1 Jan. 10, 2013

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC .......... H04L 67/18; H04L 67/22; G06Q 50/01
USPC .......................................................... 709/204
See application file for complete search history.

(56) References Cited

U.S. PATENT DOCUMENTS 7,644,012 B2 1/2010 Ishigai et al.
7,707,122 B2 * 4/2010 Hull et al. .................... 705/319
2006/0042483 A1 * 3/2006 Work et al. ...................... 101/91
2006/0247940 A1 * 11/2006 Zhu ........................ G06Q 50/01 705/1.1
2007/0288602 A1 * 12/2007 Sundaresan ................... 709/219
2008/0040370 A1 2/2008 Bosworth et al.
2008/0040475 A1 * 2/2008 Bosworth et al. ............ 709/224
2008/0097994 A1 * 4/2008 Teramoto .......... G06F 17/30943

FOREIGN PATENT DOCUMENTS

JP 2008-107867 A 5/2008
JP 2008-539528 A 11/2008
JP 2009-140029 A 6/2009
JP 2010-500649 A 1/2010
JP 2010-500651 A 1/2010
WO WO 2006/116543 A2 11/2006

OTHER PUBLICATIONS

Patent Cooperation Treaty, International Search Report and Written Opinion, International Patent Application No. PCT/US2012/045456, dated Oct. 1, 2012, 14 pages.

(Continued)

*Primary Examiner* — Wing F Chan
*Assistant Examiner* — Andrew Woo
(74) *Attorney, Agent, or Firm* — Fenwick & West LLP

(57) ABSTRACT

A user's connections in a social networking system are grouped into a number of clusters based on a measure of the connections' relationships, or affinity, to each other. The affinities among the connections are based on the connections' own relationships and indicate a likelihood that the connections are in the same social circles. The clusters are formed based on the affinities among the user's connections, where the clusters tend to have connections that have relatively high affinities with the other connections the same cluster as compared to the connections who are not in the same cluster. An iterative hierarchical clustering algorithm may be used to collapse the connections into clusters based on affinities between pairs of the connections.

3 Claims, 6 Drawing Sheets

(56) References Cited

OTHER PUBLICATIONS

Australian Government, IP Australia, Patent Examination Report No. 1, Australian Patent Application No. 2012282980, dated Aug. 12, 2016, three pages.
Canadian Intellectual Property Office, Office Action, Canadian Patent Application No. 2,841,354, dated Apr. 18, 2016, four pages.
Canadian Intellectual Property Office, Office Action, Canadian Patent Application No. 2,841,354, dated May 6, 2015, four pages.
Japan Patent Office, Office Action, Japanese Patent Application No. 2014-520218, dated Jun. 7, 2016, six pages.
Canadian Intellectual Property Office, Office Action, Canadian Patent Application No. 2,841,354, dated Apr. 3, 2017, five pages.
Australian Government, IP Australia, Examination report No. 2 for standard patent application, dated May 29, 2017, three pages.

* cited by examiner

CLUSTERING A USER'S CONNECTIONS IN A SOCIAL NETWORKING SYSTEM

BACKGROUND

This invention relates generally to social networking, and in particular to creating clusters of a user's connections in a social networking system.

A social networking system allows users to designate other users as connections by forming relationships with other users or otherwise indicating an association with one or more other users. Users can then contribute and interact with media items, use applications, join groups, list and confirm attendance at events, create pages, and perform other tasks that facilitate social interaction with their connections. In a social networking system, a user may have a very large number of connections, and these connections may be drawn from a variety of different experiences in the user's real life. For example, a user may have a number of connections from school, other connections from work, and still other sets of connections that form various different social circles.

In certain applications in the social networking system, it may be desirable to cluster a user's connections into groups of other people who are themselves within common social circles. A cluster of connections for a user may reflect common characteristics of the connections based on their affinity to each other. This may facilitate, for example, inviting a user's connections to an event so that the invitees generally know each other. The clusters of connections can be selectively blocked or promoted to the user depending on, among other factors, the user settings, context, common characteristics of the clusters, and the user's affinity with the members of the cluster. In particular, automatically clustering a user's connections satisfied the user's need for varying privacy settings on the user's different interactions. The social networking system may also alleviate the burden on the user to go through a potentially large number of connections to find one or more of them.

Some social networking systems allow users to form manual clusters, where a user directly places the user's connections into predetermined groups or lists of friends. But manual clustering can be very time consuming, and many users are unlikely to make the effort to make clusters of their friends manually. Moreover, a user may not be in the best position to know the interrelationships among that user's connections and therefore would not be able to form accurate clusters of the user's connections who are themselves in common social circles. These limitations may result in a subpar user experience when navigating through a large number of connections and trying to group those connections into coherent groups of friends. Given the limitations on creating accurate clusters of friends, concerns about privacy may also prevent the user from interacting with the social networking to the same extent as where the user knows that a specified set of actions will be visible only to certain clusters of the user's connections.

Existing algorithms for clustering are not amenable to computation on an as needed basis. The relationships between connections in a social networking system change rapidly, and to run computationally intensive algorithms on the entire social graph is a challenge. Moreover, manual methods for creating clusters of connection have several drawbacks, as explained above.

SUMMARY

Embodiments of the invention provide a mechanism to form clusters of a user's connections, and this clustering may be performed automatically without requiring input from the user to group the connections into clusters. The user's connections are grouped into clusters based on a measure of the connections' relationships to each other, thereby indicating whether the connections are in a common social circle. The measure of a relationship between two of a user's connections may be referred to as the affinity between those two connections. Various ways to measure an affinity between connections may be used, such as whether the connections are themselves connected, the number of other connections that the connections have in common, the relative number of top ranked connections in common with the connections, and other commonalities between the connections and/or of their relationships to other connections. One or more clusters of a user's connections are then formed based on the affinities among the user's connections, where the clusters tend to have connections that have relatively high affinities with the other connections the same cluster as compared to the connections who are not in the same cluster.

In one embodiment, a measure of affinity is determined between each pair of a user's connections, which may be represented in an affinity matrix. A hierarchical clustering algorithm is applied to the matrix to collapse pairs of connections into clusters by combining pairs of connections and/or clusters that have the highest affinity between each other. When a connection is added to a cluster, a new set of affinities is computed for the cluster for each existing other connection or cluster based on the added connection's affinities. This algorithm is performed iteratively until no connections or clusters of connections have a sufficiently high affinity to justify further collapsing them into larger clusters. The result is a set of one of more clusters of a user's connections, where the connections in each cluster tend to have higher affinities with each other than with connections who are not in the cluster.

Figure 1:
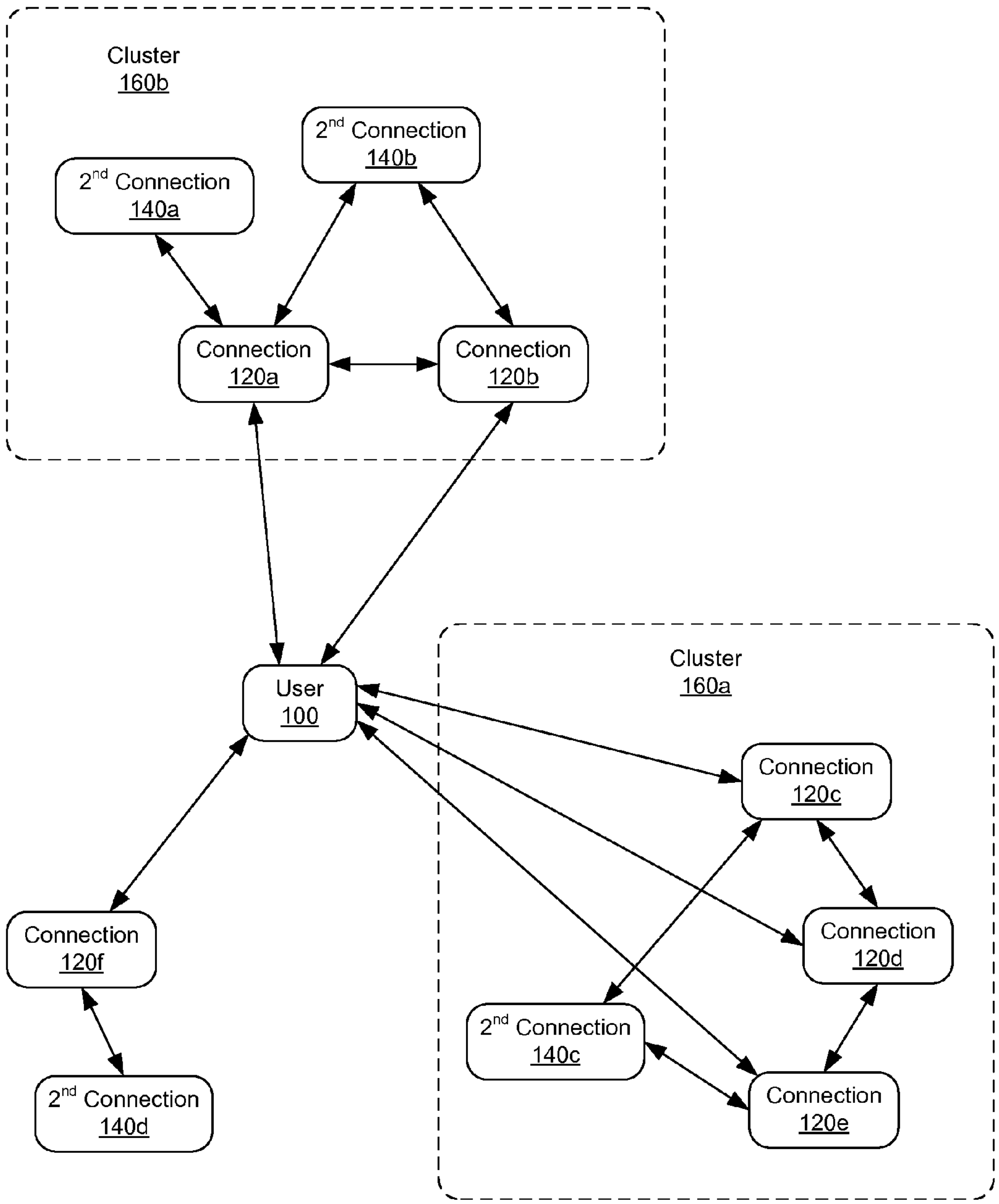
FIG. 1 is a diagram of a user and the user's connections within a social networking system, where the connections have been clustered in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An online social networking system allows users to associate themselves and establish connections with other users of the social networking system. When two users become connected, they are said to be "connections," "friends," "contacts," or "associates" within the context of the social networking system. Generally being connected in a social networking system allows connected users access to more information about each other than would otherwise be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include but are not limited to messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files.

Users of social networking systems may interact with objects such as content items, user information, user actions (for instance communication made within the social networking system, or two users becoming connections), or any other activity or data within the social networking system. This interaction may take a variety of forms, such as by communicating with or commenting on the object; clicking a button or link associated with affinity (such as a "like" button); sharing a content item, user information or user actions with other users; downloading or merely viewing a content item; or by any other suitable means for interaction. Users of a social networking system may also interact with other users by connecting or becoming friends with them, by communicating with them, or by having common connections within the social networking system. Further, a user of a social networking system may form or join groups, or may like or otherwise associate with a fan page. Finally, a social networking system user may interact with content items, websites, other users or other information outside of the context of the social networking system's web pages that are connected to or associated with the social networking system. For instance, an article on a news web site might have a "like" button that users of the social networking system can click on to express approval of the article. These interactions and any other suitable actions within the context of a social networking system may be recorded in social networking system data, which may be used to predict the likely actions will take in a given situation. The predictions could then be used to encourage more user interaction with the social networking system and enhance the user experience.

The social networking system maintains a user profile for each user. Any action that a particular member takes with respect to another member is associated with each user's profile, through information maintained in a database or other data repository. Such actions may include, for example, adding a connection to the other member, sending a message to the other member, reading a message from the other member, viewing content associated with the other member, attending an event posted by another member, among others. The user profiles also describe characteristics, such as work experience, educational history, hobbies or preferences, location or similar data, of various users and include data describing one or more relationships between users, such as data indicating users with similar or common work experience, hobbies or educational history. Users can also post messages specifically to their profiles in the form of status updates. Users of a social networking system may view the profiles of other users if they have the permission to do so. In some embodiments, becoming a connection of a user automatically provides the permission to view the user's profile.

The social networking system also attempts to deliver the most relevant information to a viewing user employing algorithms to filter the raw content on the network. Content is filtered based on the attributes in a user's profile, such as geographic location, employer, job type, age, music preferences, interests, or other attributes. Newsfeed stories may be generated to deliver the most relevant information to a user based on a ranking of the generated content, filtered by the user's affinity, or attributes. Similarly, social endorsement information may be used to provide social context for advertisements that are shown to a particular viewing user.

The social networking system also provides application developers with the ability to create applications that extend the functionality of the social networking system to provide new ways for users to interact with each other. For example, an application may provide an interesting way for a user to communicate with other users, or allow users to participate in multi-player games, or collect some interesting information such as news related to a specific topic and display it to the member periodically. To the applications, the social networking system resembles a platform. Applications may also be considered objects in the social networking system.

By automating a process for determining clusters based on a user's connections, embodiments of the invention improve the experience of the user on the social networking system. The social networking may then determine the characteristics common to the connections in a cluster and selectively display or hide certain clusters depending on the context and the characteristics of the clusters. For example, when the user is using an application to connect with former classmates, only connections from clusters that represent the schools and colleges the user attended might be displayed. Similarly, when a user broadcasts a message about a personal event in the user's life, responsive to the user's settings, the message may not be displayed to clusters representing the user's connections in the workplace. Another example involves letting the user choose to permit only connections from a select set of clusters view the complete profile for the user or photos posted by the user. In these examples, the user is spared from having to navigate a potentially huge list of connections and make explicit per-connection decisions regarding what information to display or not display to each of the user's connections.

FIG. 1 is a high level diagram illustrating the concept of clustering the connections of a user in a social networking system. A user 100 in the social networking system is connected to a number of connections 120. Each of these connections 120 may also be connected to the user's connections 120 as well as to other second-order connections 140, who are not connected directly to the user 100. Only the second-order connections 140 common to at least two connections 120 are shown in FIG. 1. Additionally, although only a limited number of connections 120 and second-order connections 140 are shown in FIG. 1, the social networking system may support an arbitrary number of connections 120 and second-order connections 140.

As described herein, embodiments of the invention group at least some of the user's connections 120 into one or more clusters 160. The clusters 160 comprise one or more of the user's connections 120 who have been determined to have common relationships with other connections 120 in the same cluster 160. As described in more detail below, the connections 120 may be divided into clusters 160 based on affinities determined between each pair of connections 120. The affinity for a pair of connections may be determined based at least in part on, among other factors, whether the connections 120 are themselves connected (e.g., connections 120*a* and 120*b* are connected while connections 120*c* and 120*e* are not) and the number of second-order connections 140 the connections 120 have in common (e.g., connections 120*a* and 120*b* have one second-order connection 140*b* in common).

Figure 2:
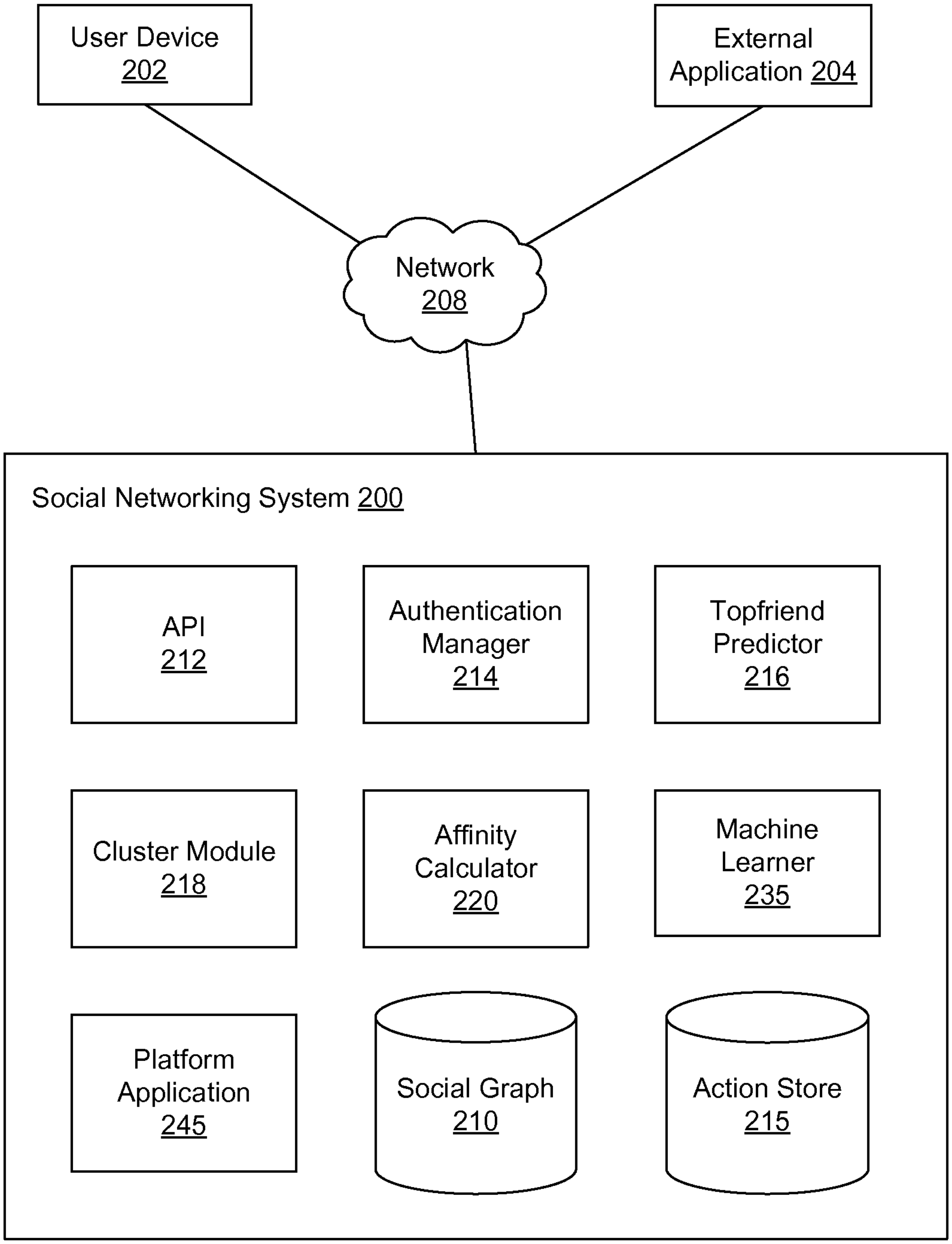
FIG. 2 is a high level embodiment of a social networking system, in accordance with an embodiment of the invention.

FIG. 2 is a high-level block diagram of a social networking system according to one embodiment. FIG. 2 illustrates a social networking system 200, a user device 202 and an external application 204 connected by a network 208. A user 100 interacts with the social networking system 200 using a user device 202, such as a personal computer or a mobile phone. The user device 202 may communicate with the social networking system 200 via an application such as a web browser or native application. Typical interactions between the user device 202 and the social networking system 200 include operations such as viewing profiles of other users of the social networking system 200, contributing and interacting with media items, joining groups, listing and confirming attendance at events, checking in at locations, liking certain pages, creating pages, and performing other tasks that facilitate social interaction.

The social networking system 200 comprises a number of components used to store information about its users and objects represented in the social networking environment, as well as the relationships among the users and objects. The social networking system 200 additionally comprises components to enable several actions to user devices 202 of the system as described above. The social graph 210 stores the connections that each user 100 has with other users of the social networking system 200. The social graph 210 may also store second-order connections, in some embodiments. The connections may thus be direct or indirect. For example, if user A is a first-order connection of user B, and B is a first-order connection of C, then C is a second-order connection of A on the social graph 210.

The action store 215 stores actions that have been performed by the users of the social networking system 200. The actions may include an indication of the time associated with those actions and references to any objects related to the actions. Additionally, the action store 215 may store statistics related to historical interactions between users and objects. For example, the action store 215 may contain the number of wall posts in 30 days by a user, number of photos posted by the user in 30 days and number of distinct users that received the user's comments in 30 days. For a given link between two users, user A and user B, the action store may contain actions such as the number of profile page views from A to B, the number of photo page views from A to B, and the number of times A and B were tagged in the same photo, and these actions may be associated with a timestamp or may be filtered by a cutoff (e.g., 24 hours, 90 days, etc.). The actions recorded in the action store 215 may be farmed actions, which are performed by a user in response to the social networking system 200 providing suggested choices of actions to the user.

The top friend predictor 216 uses a scoring function to compute a score that predicts how likely it is that a user 100 will interact with a connection 120. The score may be representative of a user's interest in interacting with the connection 120. In one embodiment, the historical interactions of the user 100 with the connection 120 are used as a signal of the user's future interest in similar interactions with the connection 120, which is a proxy for whether that connection 120 is one of the user's top friends. Based on the scores, the social networking system determines the top friends for user 100. The machine learner 235 implements machine learning algorithms to determine the scoring function used to determine top friends. Embodiments of the top friend predictor 216 are disclosed in U.S. application Ser. No. 13/093,744, filed Apr. 25, 2011, the contents of which are incorporated by reference in their entirety.

Figure 3:
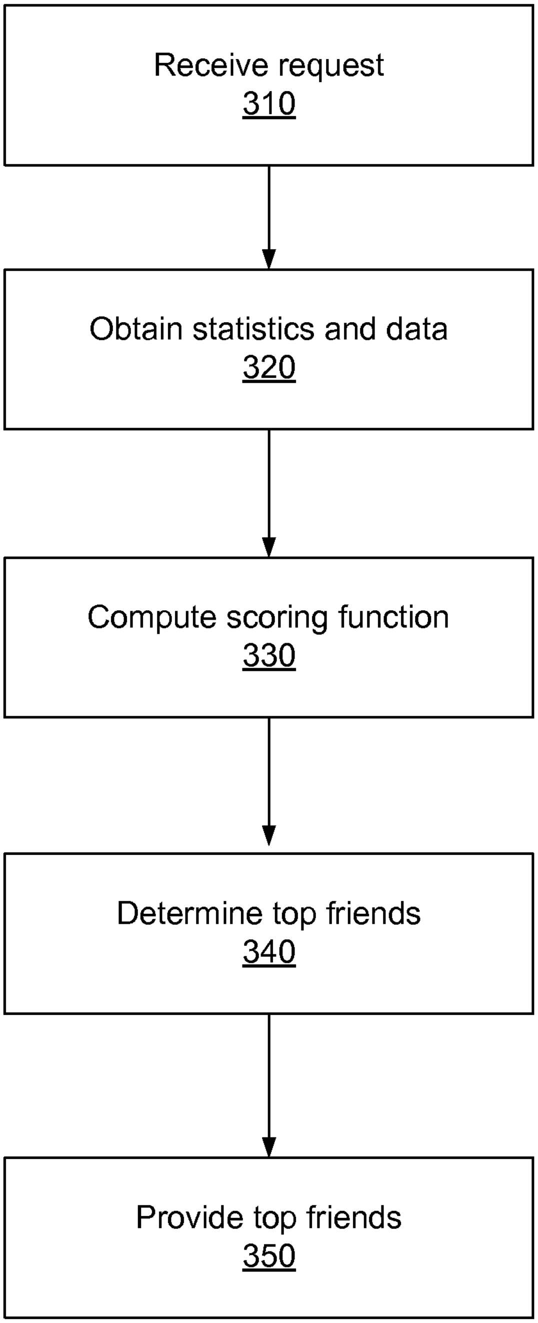
FIG. 3 is a flow chart of a process for determining a user's top friends, in accordance with an embodiment of the invention.

FIG. 3 illustrates a process for determining a user's top friends based on a request, in accordance with an embodiment of the invention. The social networking system 200 receives 310 a request for the top friends of a user 100. In certain embodiments of the invention, the request may specify a number of top friends to be returned. The social networking system 200 then obtains 320 statistics related to the historical interactions of the user 100 and the connections 120 of the user along with static data from the profiles. The social networking system 200 computers 330 a score for each connection 120 before determining 340 a list of top friends. It provides 350 the same as output. In some embodiments, the list of top friends provided as output is sorted by the score assigned to each top friend.

The authentication manager 214 authenticates a user 100 on user device 202 as belonging to the social graph on the social networking system 200. It allows a user 100 to log into any user device 202 that has an application supporting the social networking system 200. In some embodiments, the API 212 works in conjunction with the authentication manager 214 to validates users via external applications 204.

The social networking system 200 may also support one or more platform applications 245 and one or more external applications 204. Platform applications 245 are applications that operate within the social networking system 200 but may be provided by third parties other than an operator of the social networking system 200. Platform applications 245 may include social games, messaging services, and any other application that uses the social platform provided by the social networking system 200. The external application 204 may interact with the social networking system 200 via API B20. The external applications 204 can perform various operations supported by the API B20, such as enabling users to send each other messages through the social networking system 200 or showing advertisements routed through the social networking system 200.

The affinity calculator 220 computes an affinity for a pair of connections. The affinity for a pair of connections is a measure of the relationship between the pair of connections and is dependent on, inter alia, (a) whether the connections 120 are themselves connected in the social graph 210, and (b) the relative number of top friends the connections 120 have in common. The affinity calculator 220 may send a request to the top friend predictor 216 to obtain the top friends for each of the pair of connections or obtain the same along with the input. In some embodiments, the affinity is defined to be:

$$A(f_i, f_j) = \alpha * 1(f_i, f_j) + (1-\alpha) * \frac{N(T(f_i) \cap T(f_j))}{N(T(f_i) \cup T(f_j))_s} \quad (1)$$

where $A(f_i, f_j)$ is the affinity for connections $f_i$ and $f_j$, for $i=1, 2, \ldots$, and $i \neq j$;

$\alpha$ is a constant that is pre-specified;

$l(f_i, f_j)$ for connections $f_i$ and $f_j$, for i=1, 2, . . . , and i≠j indicates with a 1 or 0 depending on whether connections $f_i$ and $f_j$ are themselves connected or not, respectively;

$T(f_i)$ is the top friends function computed by the top friend predictor 216 returning a list of top friends as a set; and N(S) is a function returning the number of elements in set S.

This is just one example of a mechanism for computing the affinity between two connections of a user, and various other calculations may be used. For example, the function $l(f_i, f_j)$ may return a constant other than unity if $f_i$ and $f_j$ are themselves connected.

The denominator of the second term on the right hand side of (1) represents a normalization of the numerator denoting the number of common top friends. The normalization is performed to offset the differences among users in the number of top friends identified from the social graph 210. By varying the pre-specified constant α, the affinity calculator 220 can vary the relative weight assigned to the connectedness of two connections and the relative number of top friends the two connections have in common.

Figure 4:
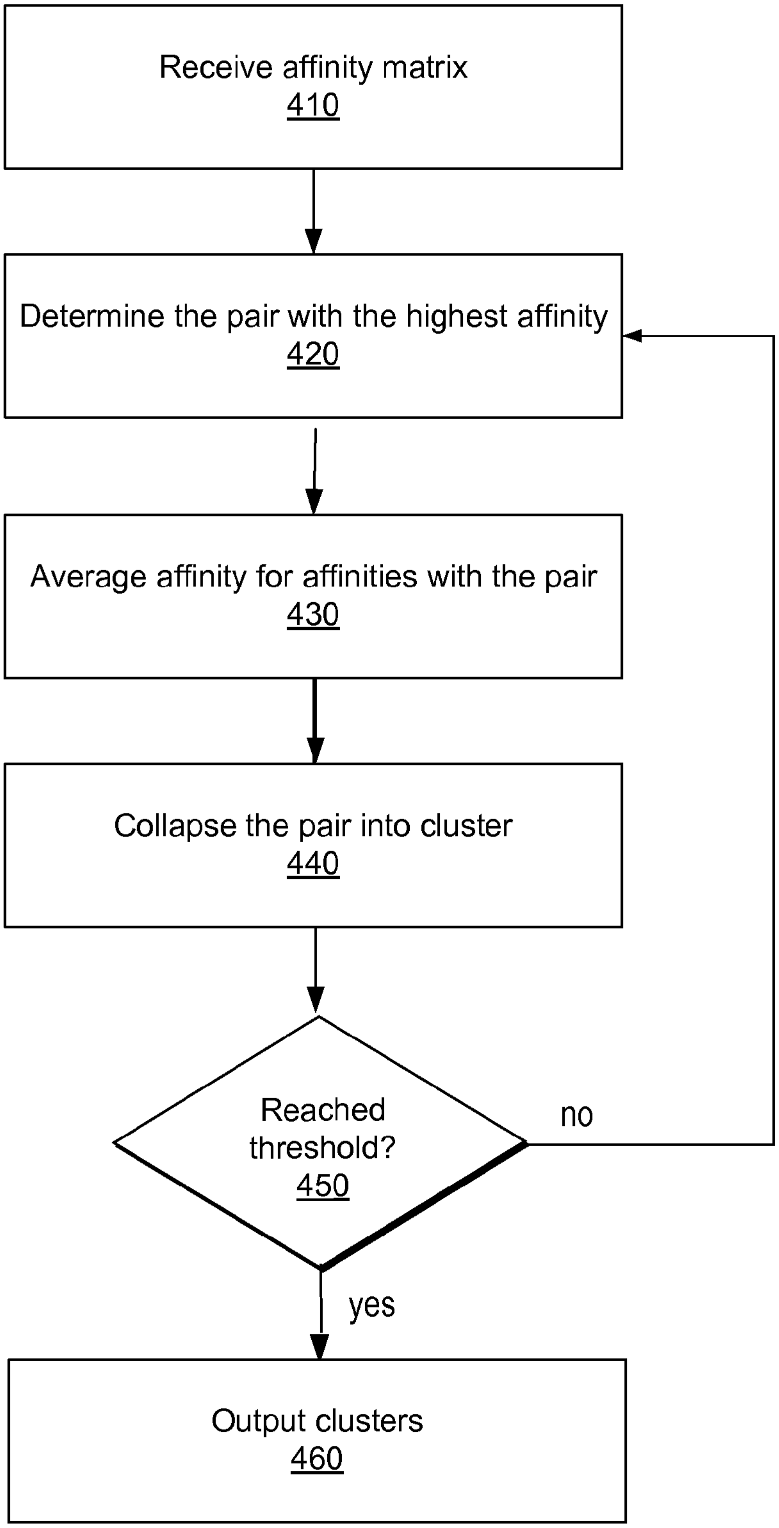
FIG. 4 is a flow chart of a process for clustering a user's connections based on affinities among the connections, in accordance with an embodiment of the invention.

FIG. 4 illustrates a process performed by the cluster module 218, in one embodiment. The cluster module 218 is responsible for grouping a user's connections 120 into one or more clusters 160 based on the affinities among those connections 120. In one embodiment, the cluster module 218 makes requests to the affinity calculator 220 directly for each pair of connections 120 and receives 410 a matrix of affinities with rows and columns represented by the connections 120. Representations and data structures other than a matrix may also be used to store the affinities between the pairs of connections 120. In another embodiment, the cluster module 218 first obtains the top friends for each of the connections 120 from the top friend predictor 218 and provides the top friends as input to the affinity calculator. An example of an affinity matrix, based on the example connections 120 illustrated in FIG. 1, is show in Table 1. Forms of representation including data structures other than a matrix will be apparent to one skilled in the art.

TABLE 1

| Connections | 120a | 120b | 120c | 120d | 120e | 120f |
|---|---|---|---|---|---|---|
| 120a | — | | | | | |
| 120b | 3.7 | — | | | | |
| 120c | 1.2 | 1.4 | — | | | |
| 120d | 1.0 | 1.6 | 3.8 | — | | |
| 120e | 1.2 | 1.2 | 3.6 | 3.4 | — | |
| 120f | 0.8 | 1.2 | 0.8 | 1.0 | 1.2 | — |

The cluster module 218 then determines 420 the pair of connections having the highest affinity in the matrix. In this example, connections 120*c* and 120*d* are determined to have the highest affinity, so connections 120*c* and 120*d* will be the first to be put into a cluster. The cluster module 218 also obtains 430 an average of the affinities for each of the remaining connections, 120*a*, 120*b*, 120*e* and 120*f*, with connections 120*c* and 120*d* as shown in Table 2. The cluster module 218 then collapses 440 connections 120*c* and 120*d* into a new cluster, denoted as cluster 160*a*. As illustrated in Table 2, this new cluster 160*a* replaces connections 120*c* and 120*d*, and the averages of those connections' affinities are used for the affinities of cluster 160*a* with the other connections 120*a*, 120*b*, 120*e*, and 120*f*.

TABLE 2

| Connections/ Clusters | 120a | 120b | 160a | 120e | 120f |
|---|---|---|---|---|---|
| 120a | — | | | | |
| 120b | 3.7 | — | | | |
| 160a | 1.1 | 1.5 | — | | |
| 120e | 1.2 | 1.2 | 3.5 | — | |
| 120f | 0.8 | 1.2 | 0.9 | 1.2 | — |

Once the first cluster 160*a* has been created, the cluster module 218 iterates the process. The process may be repeated until there are no remaining affinities above a threshold, which indicates that the existing connections 120 and clusters 160 are not sufficiently interrelated to justify further collapsing of the connections 120 into larger clusters 160. In this embodiment, the threshold affinity value is 2.0, and since there are affinities that are above this threshold, the cluster module 218 returns to step 420 with a new matrix of affinities between connections and clusters. In the example, the matrix received before proceeding to step 420 is shown in Table 2.

Continuing the example, as shown in Table 2, the connections 120*a* and 120*b* are determined to have the highest affinity. Iterating the process described above, connections 120*a* and 120*b* are collapsed into a new cluster 160*b*, and new affinities are computed for cluster 160*b* by averaging the affinities of connections 120*a* and 120*b*. The result is shown in Table 3.

TABLE 3

| Connections/ Clusters | 160b | 160a | 120e | 120f |
|---|---|---|---|---|
| 160b | — | | | |
| 160a | 1.3 | — | | |
| 120e | 1.2 | 3.5 | — | |
| 120f | 1.0 | 0.9 | 1.2 | — |

From Table 3, the highest remaining affinity is between connection 120*e* and cluster 160*a*. Accordingly, the connections associated with this highest affinity (i.e., connection 120*e* as well as connections 120*c* and 120*d*, which are already in cluster 160*a*) are combined into cluster 160*a*. The affinities for this new cluster 160*a* may be obtained from averaging the affinities of the connections 120 in the cluster 160*a*, as described above, resulting in Table 4. Although a simple average between connection 120*e* and cluster 160*a* is shown, other possibilities such as a weighted average based on the number of connections in the cluster may be used.

TABLE 4

| Connections/ Clusters | 160b | 160a | 120f |
|---|---|---|---|
| 160b | — | | |
| 160a | 1.25 | — | |
| 120f | 1.0 | 1.05 | — |

Although not shown in this example, two clusters 160 may themselves be collapsed into a combined cluster in the same way as a connection 120 can be combined with another connection 120 or with a cluster 160. As mentioned above, the affinity threshold in this example is 2.0. Since there are no remaining affinities that are above this threshold, the cluster module 218 stops combining connections 120 and clusters 160 into new, larger clusters 160. The cluster module 218 thus outputs 460 the result of the clustering process, which may comprise an identification of the clusters 160 and the connections 120 that are in each cluster 160.

Figure 5:
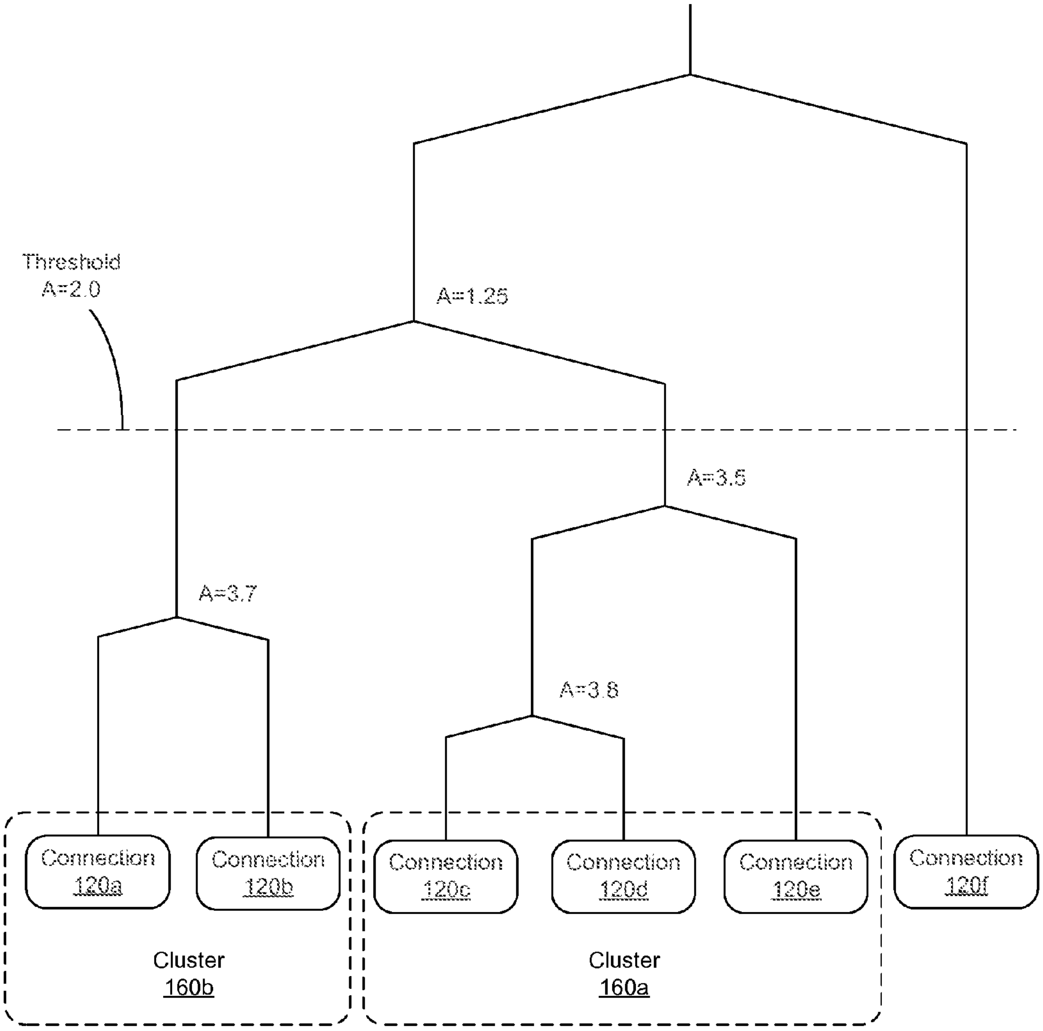
FIG. 5 illustrates an example of a dendrogram representing affinities among a user's connections and the resulting clusters, in accordance with an embodiment of the invention.

The cluster module 218 may store the final output of clusters 160 as well as the intermediate set of connections and clusters on a dendrogram, a data structure known to a person skilled in the art. FIG. 5 illustrates an example of the dendrogram used to represent the clusters 160 in the previous example. In one embodiment, the height of the individual dendrogram branches, measured from the leaves represented by the connections 120, shown by distances 520 are given by $$d(a_i,a_j)=1/A(a_i,a_j) \qquad (1)$$

where $A(a_i, a_j)$ is the affinity for connections or clusters $a_i$ and $a_j$, for i=1, 2, . . . , and i≠j; and $d(a_i, a_j)$ is the height of the branch of the dendrogram corresponding to the connections or clusters $a_i$ and $a_j$, for i=1, 2, . . . , and i≠j. More generally, the distances 520 may be any constant multiple of the distance 520 shown in (1) or bear some other relationship that is inversely proportional to the pair-wise affinity.

In some embodiments, the cluster module 218, after having determined the clusters 160 for output, may further collapse the clusters 160 into a single universal cluster, as shown in FIG. 5. The resulting data structure, which includes the structure of the branches between connections, enables the system to generate clusters quickly based on a variable threshold. For example, tightening the threshold (e.g., by increasing the threshold affinity, which is represented as lowering the bar in FIG. 5) results in less clustering, whereas loosening the threshold results in more clustering. This allows a user 100 to vary the threshold to obtain a desired amount of clustering of the user's connections 120.

Figure 6:
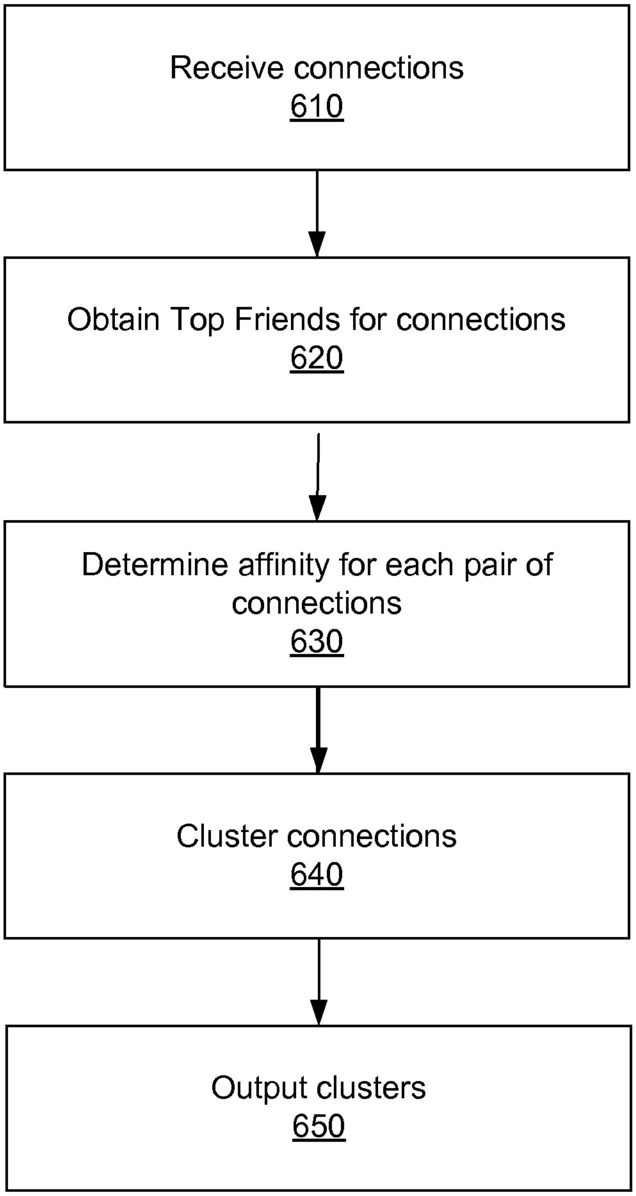
FIG. 6 is a flow chart of a process for clustering a user's connections in a social networking system, in accordance with an embodiment of the invention.

FIG. 6 illustrates an example of a process used by the cluster module 218 to cluster the connections of a user 100 in a social networking system. The social networking system 200 first receives 610 the connections 120 of user 100 to be clustered. It then obtains 620 the top friends for the connections 120 and determines 630 the affinity for each pair of connections 120, as described earlier, in the cluster module 218. Using the cluster module 218 again, the social networking system 640 collapses the connections iteratively, until, in some embodiments, it has determined a specified minimum number of clusters 160 or the maximum affinity between the clusters in the iterative process of FIG. 4 is below a specified minimum value.

Embodiments of the invention may also be used to cluster connections belonging to an organization that is possibly represented entirely in the social networking system.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

identifying a plurality of connections of a user, each connection comprising another user of a social networking system with whom the user has established a relationship in the social networking system;

for each of at least a plurality of pairs of the connections, determining a measure of affinity between the pair of connections based at least in part a number of friends in common between the pair of connections including:

determining a measure of overlap of other users with whom the pair of connections have commonly established the relationship in the social networking system and who have been determined to be closely associated with the pair of connections, wherein the other users with whom the pair of connections have commonly established the relationship are determined to be closely associated with the pair of connections based on their historical interactions in the social networking system;

iteratively clustering the connections into one or more clusters by performing the following, by a computing system:

identifying two or more connections associated with the highest measure of affinity, collapsing the identified connections into a new cluster, recomputing new measures of affinity between the new cluster and each of the remaining connections and other clusters, and stopping the clustering when the remaining highest measure of affinity is below a threshold; and outputting a result of the clustering, the result comprising an identification of the clusters and the user's connections who have been assigned to the clusters.

2. The method of claim 1, wherein determining the measure of affinity further comprises determining whether the pair of connections have established the relationship with each other in the social networking system.

3. The method of claim 1, wherein the recomputed new measures of affinity are based on an average of the measures of affinity between the identified connections and each of the remaining connections and other clusters.

* * * * *